(12) United States Patent
Tucker et al.

(10) Patent No.: US 12,115,937 B2
(45) Date of Patent: Oct. 15, 2024

(54) ON-BOARD DIAGNOSTIC SECOND GENERATION MODULE INCORPORATING A LOW POWER RADAR-BASED SENSOR

(71) Applicant: T-MOBILE INNOVATIONS LLC, Overland Park, KS (US)

(72) Inventors: Wilfred I. Tucker, Centennial, CO (US); Mark Homan Chan, Olathe, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 115 days.

(21) Appl. No.: 18/084,791

(22) Filed: Dec. 20, 2022

(65) Prior Publication Data

US 2024/0198964 A1 Jun. 20, 2024

(51) Int. Cl.
*B60R 25/31* (2013.01)
*B60R 25/104* (2013.01)
*B60R 25/20* (2013.01)
*B60R 25/30* (2013.01)
*B60R 25/32* (2013.01)
(Continued)

(52) U.S. Cl.
CPC .......... *B60R 25/307* (2013.01); *B60R 25/104* (2013.01); *B60R 25/2045* (2013.01); *B60R 25/31* (2013.01); *B60R 25/32* (2013.01); *G01S 13/88* (2013.01); *G07C 5/0808* (2013.01)

(58) Field of Classification Search
CPC . B60R 25/307; B60R 25/104; B60R 25/2045; B60R 25/31; B60R 25/32; G01S 13/88; G07C 5/0808
See application file for complete search history.

(56) References Cited

U.S. PATENT DOCUMENTS 5,482,314 A * 1/1996 Corrado ................. G06V 40/10
701/45
6,598,900 B2 * 7/2003 Stanley ............. B60R 21/01534
701/45
(Continued)

OTHER PUBLICATIONS

"BGT60LTR11AIP—A completely autonomous radar sensor", Infineon Technologies AG, Retrieved from Internet URL : https://www.infineon.com/dgdl/Infineon-BGT60LTR11AIP_ProductBrief-ProductBrief-v01_01-EN.pdf?fileId=5546d4627564a75001756a38b2e74bc9, accessed on Mar. 19, 2023, pp. 2 (Aug. 2021).

(Continued)

*Primary Examiner* — Nay Tun
(74) *Attorney, Agent, or Firm* — Shook, Hardy & Bacon L.L.P.; Sarah Rieth (57) ABSTRACT

Aspects provided herein provide methods, apparatus, and a non-transitory computer storage medium storing computer instructions for vehicle disturbance alerting in a network. The method begins with receiving a vibration alert from a sensor installed in a vehicle. The sensor may be an accelerometer, gyroscope, or motion-capable sensor and is in communication with a low power radar sensor that is also installed in the vehicle. A low power radar sensor is activated in response to the vibration alert. At least one radar signature is received from the low power radar sensor. The radar signature is then compared with at least one driver radar signature. The driver radar signature is recorded when a driver occupies a driver seat position and operates the vehicle. Based on the comparison, a determination is made whether to issue a vehicle disturbance alert.

19 Claims, 5 Drawing Sheets

(51) Int. Cl.
*G01S 13/88* (2006.01)
*G07C 5/08* (2006.01)

(56) References Cited

U.S. PATENT DOCUMENTS

| | | | |
|---|---|---|---|
| 6,753,780 B2* | 6/2004 | Li | B60N 2/002 |
| | | | 340/573.1 |
| 9,671,492 B2* | 6/2017 | Diewald | B60R 21/01534 |
| 11,230,293 B2* | 1/2022 | Gomez | B60R 21/01534 |
| 11,941,896 B1* | 3/2024 | Drake | G08B 21/0211 |
| 11,959,998 B2* | 4/2024 | Peng | G01S 13/345 |
| 2017/0350718 A1* | 12/2017 | Schulz | G01C 21/3679 |
| 2020/0219469 A1* | 7/2020 | Mittal | B60K 35/22 |
| 2020/0273263 A1* | 8/2020 | Tang | B60Q 5/005 |
| 2020/0372782 A1* | 11/2020 | Yu | G08B 21/22 |
| 2022/0075051 A1* | 3/2022 | Woo | G01S 7/414 |
| 2022/0388464 A1* | 12/2022 | Roberts | B60R 21/01554 |

OTHER PUBLICATIONS

Evanczuk, S., "Use a PCR Module to Rapidly Develop Accurate, Low-Power Radar-Based Sensors", Low-Power Pulsed Coherent Radar Modules I DigiKey, Retrieved from Internet URL : https://www.digikey.com/en/articles/use-a-pcr-module-to-rapidly-develop-radar-based-sensors, accessed on Mar. 19, 2023, pp. 9 (May 14, 2019).

Liempd, B. V., and Craninckx, J., "Ultra-sensitive and low-power radar enables intuitive human-computer interaction", Radar enables intuitive human-computer interaction I imec, Retrieved from Internet URL : https://www.imec-int.com/en/articles/ultra-sensitive-and-low-power-radar-enables-intuitive-human-computer-interaction, accessed on Mar. 19, 2023 pp. 14 (Feb. 17, 2020).

\* cited by examiner

ON-BOARD DIAGNOSTIC SECOND GENERATION MODULE INCORPORATING A LOW POWER RADAR-BASED SENSOR

BACKGROUND

Many car and truck owners have purchased connectivity and vehicle monitoring devices from vehicle aftermarket suppliers. These devices may be known as onboard diagnostic second generation (OBD II) devices. An OBD II device may provide features such as vehicle location tracking, connectivity through a WiFi hotspot, roadside assistance, and disturbance alerts. Disturbance alerts may advise an owner if the vehicle is broken into, hit, or bumped. With the rise in vehicle theft and catalytic converter theft, many vehicle owners are interested in protection. Disturbance alerts can only infer when a vehicle is broken into and also include a multi-minute lag before an alert is issued. The multi-minute lag time can also cause false alerts, which may occur when a driver takes too long to start the ignition, causing an alert, even though the driver is the vehicle owner. In addition, ODB II devices need battery power to issue alerts, which can adversely affect a vehicle's battery if parked for a considerable period of time.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods and systems for vehicle disturbance alerting in a network. The method begins with receiving a vibration alert from a sensor installed in a vehicle. This vibration alert activates a low power radar sensor in response. At least one radar signature is received at an onboard diagnostics mode from the low power radar sensor. This radar signature is then compared with at least one driver radar signature, wherein the at least one driver radar signature is recorded when a driver occupies a driver seat position and operates the vehicle. Based on the comparison, a determination is made whether or not to issue a vehicle disturbance alert.

In a further embodiment, an apparatus for vehicle disturbance alerting in a network is provided. The apparatus includes a sensor module in communication with an onboard diagnostics module. A low power radar sensor is in communication with at least one processor, a memory, the sensor module, and the onboard diagnostics module, wherein the low power radar sensor is configured to record at least one driver radar signature when a driver occupies a driver seat position and operates the vehicle.

An additional embodiment provides a non-transitory computer storage media storing computer-useable instructions that, when executed by one or more processors cause the processors to receive a vibration alert from a sensor installed in a vehicle. A low power radar sensor in the vehicle may be activated in response to the vibration alert. The low power radar sensor can generate at least one radar signature after activation. The at least one radar signature is the compared with at least one driver radar signature, wherein the at least one driver radar signature is recorded when a driver occupies a driver seat and operates the vehicle. Based on the comparison, the processors determine if a vehicle disturbance alert should be issued.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
6G Sixth-Generation Cellular Communication System
AI Artificial Intelligence
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs EEPROM Electrically Erasable Programmable Read Only Memory
LED Light Emitting Diode
LTE Long Term Evolution
MIMO Multiple Input Multiple Output
MD Mobile Device
ML Machine Learning
PC Personal Computer
PCS Personal Communications Service
PDA Personal Digital Assistant
PDSCH Physical Downlink Shared Channel
PHICH Physical Hybrid ARQ Indicator Channel
PUCCH Physical Uplink Control Channel
PUSCH Physical Uplink Shared Channel
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, 25th Edition (2009).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., nodes, cell sites, cell towers) to provide network coverage. The base stations are employed to broadcast and transmit transmissions to user devices of the telecommunications network. An base station may be considered to be a portion of a base station that may comprise an antenna, a radio, and/or a controller. In aspects, a base station is defined by its ability to communicate with a user equipment (UE), such as a wireless communication device (WCD), according to a single protocol (e.g., 3G, 4G, LTE, 5G, or 6G, and the like); however, in other aspects, a single base station may communicate with a UE according to multiple protocols. As used herein, a base station may comprise one base station or more than one base station. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an EnodeB). In this regard, typically only one active uplink connection can occur per frequency. The base station may include one or more sectors served by individual transmitting/receiving components associated with the base station (e.g., antenna arrays controlled by an EnodeB). These transmitting/receiving components together form a multi-sector broadcast arc for communication with mobile handsets linked to the base station.

As used herein, "base station" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE), wherein the base station is not intended to be used while in motion in the provision of the service. The term/abbreviation UE (also referenced herein as a user device or wireless communications device (WCD)) can include any device employed by an end-user to communicate with a telecommunications network, such as a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 500 described herein with respect to FIG. 5.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station.

In aspects, a UE provides UE data including location and channel quality information to the wireless communication network via the base station. Location information may be based on a current or last known position utilizing GPS or other satellite location services, terrestrial triangulation, an base station's physical location, or any other means of obtaining coarse or fine location information. Channel quality information may indicate a realized uplink and/or downlink transmission data rate, observed signal-to-interference-plus-noise ratio (SINR) and/or signal strength at the user device, or throughput of the connection. Channel quality information may be provided via, for example, an uplink pilot time slot, downlink pilot time slot, sounding reference signal, channel quality indicator (CQI), rank indicator, precoding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the base station or at the individual antenna array of the base station. In other aspects, the processing of said information may be done remotely.

A service state of the UEs may include, for example, an in-service state when a UE is in-network (i.e., using services of a primary provider to which the UE is subscribed to, otherwise referred to as a home network carrier), or when the UE is roaming (i.e., using services of a secondary provider providing coverage to the particular geographic location of the UE that has agreements in place with the primary provider of the UE). The service state of the UE may also include, for example, an emergency only state when the UE is out-of-network and there are no agreements in place between the primary provider of the UE and the secondary provider providing coverage to the current geographic location of the UE. Finally, the service state of the UE may also include, for example, an out of service state when there are no service providers at the particular geographic location of the UE.

The UE data may be collected at predetermined time intervals measured in milliseconds, seconds, minutes, hours, or days. Alternatively, the UE data may be collected continuously. The UE data may be stored at a storage device of the UE, and may be retrievable by the UE's primary provider as needed and/or the UE data may be stored in a cloud based storage database and may be retrievable by the UE's primary provider as needed. When the UE data is stored in the cloud based storage database, the data may be stored in association with a data identifier mapping the UE data back to the UE, or alternatively, the UE data may be collected without an identifier for anonymity.

In accordance with a first aspect of the present disclosure a method of vehicle disturbance alerting in a network is provided. The method begins with receiving a vibration alert from a sensor installed in a vehicle. The sensor may be a gyroscope, accelerometer, or motion-capable sensor. This vibration alert activates a low power radar sensor in the vehicle in response. At least one radar signature is received at an onboard diagnostics module from the low power radar sensor. This radar signature is then compared with at least one driver radar signature, wherein the at least one driver radar signature is recorded when a driver occupies a driver seat position and operates the vehicle. Based on the comparison, a determination is made whether or not to issue a vehicle disturbance alert.

A second aspect of the present disclosure provides an apparatus vehicle disturbance alerting in a network is provided. The apparatus includes a sensor module in communication with an onboard diagnostics module in a vehicle. A low power radar sensor is in communication with at least one processor, a memory, the sensor module, and the onboard diagnostics module, wherein the low power radar sensor is configured to record at least one driver radar signature when a driver occupies a driver seat position and operates the vehicle.

Another aspect of the present disclosure is directed to a non-transitory computer storage media storing computer-useable instructions that, when used by one or more processors, cause the processors to receive a vibration alert from a sensor installed in a vehicle. A low power radar sensor in the vehicle may be activated in response to the vibration alert. The low power radar sensor can generate at least one radar signature after activation. The at least one radar signature is the compared with at least one driver radar signature. The driver radar signature is recorded when a driver occupies a driver seat and operates the vehicle. Based on the comparison, the processors determine if a vehicle disturbance alert should be issued.

Figure 1:
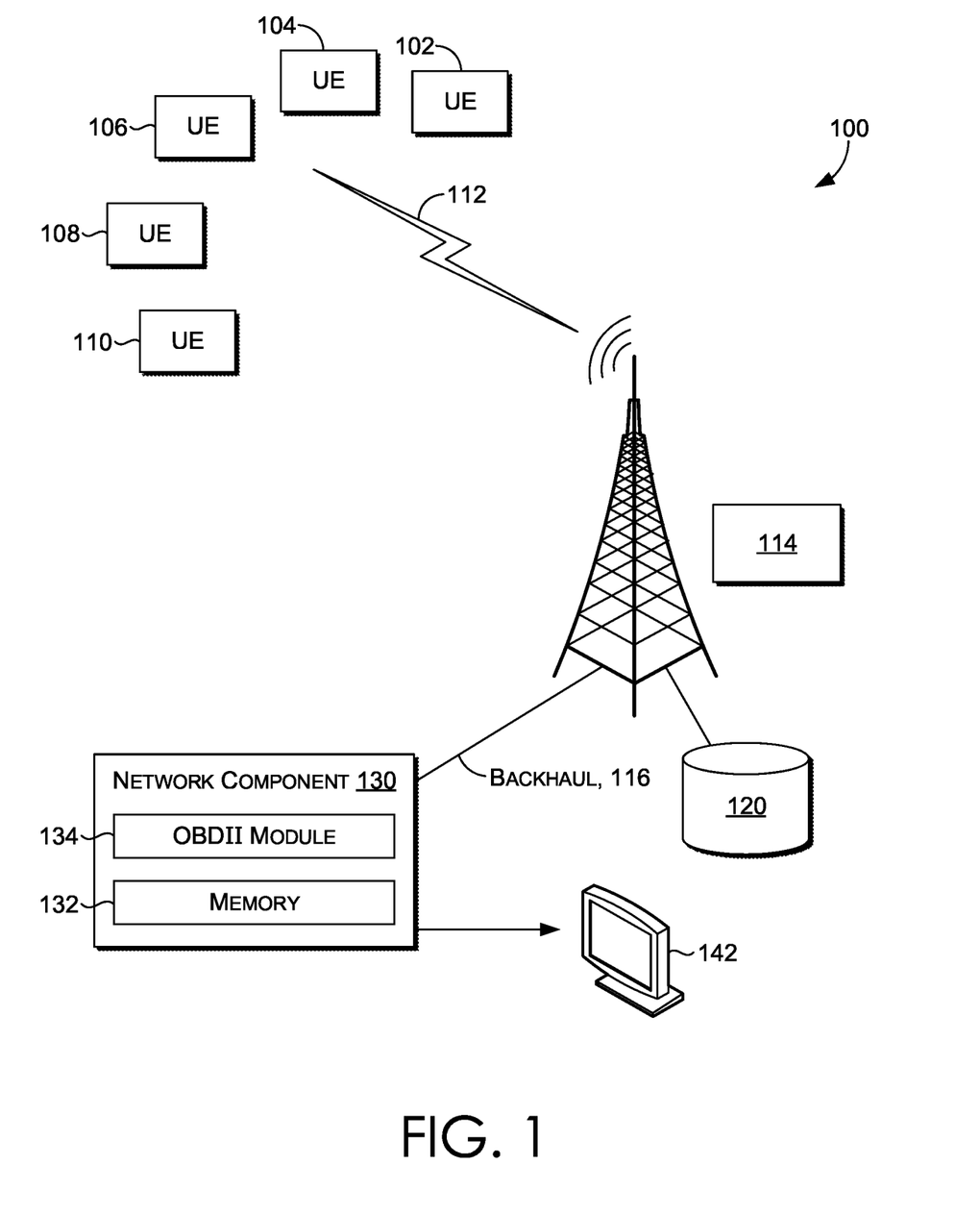
FIG. 1 depicts a diagram of an exemplary network environment in which implementations of the present disclosure may be employed, in accordance with aspects herein.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement to any one or combination of components illustrated.

Network environment 100 includes UE devices 102, 104, 106, 108, and 110, base station 114 (which may be a cell site or the like), and one or more communication channels 112. The communication channels 112 can communicate over frequency bands assigned to the carrier. In network environment 100, UE devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, an extended reality device, and any combination of these delineated devices, or any other device (such as the computing device (500) that communicates via wireless communications with the base station 114 in order to interact with a public or private network.

Figure 5:
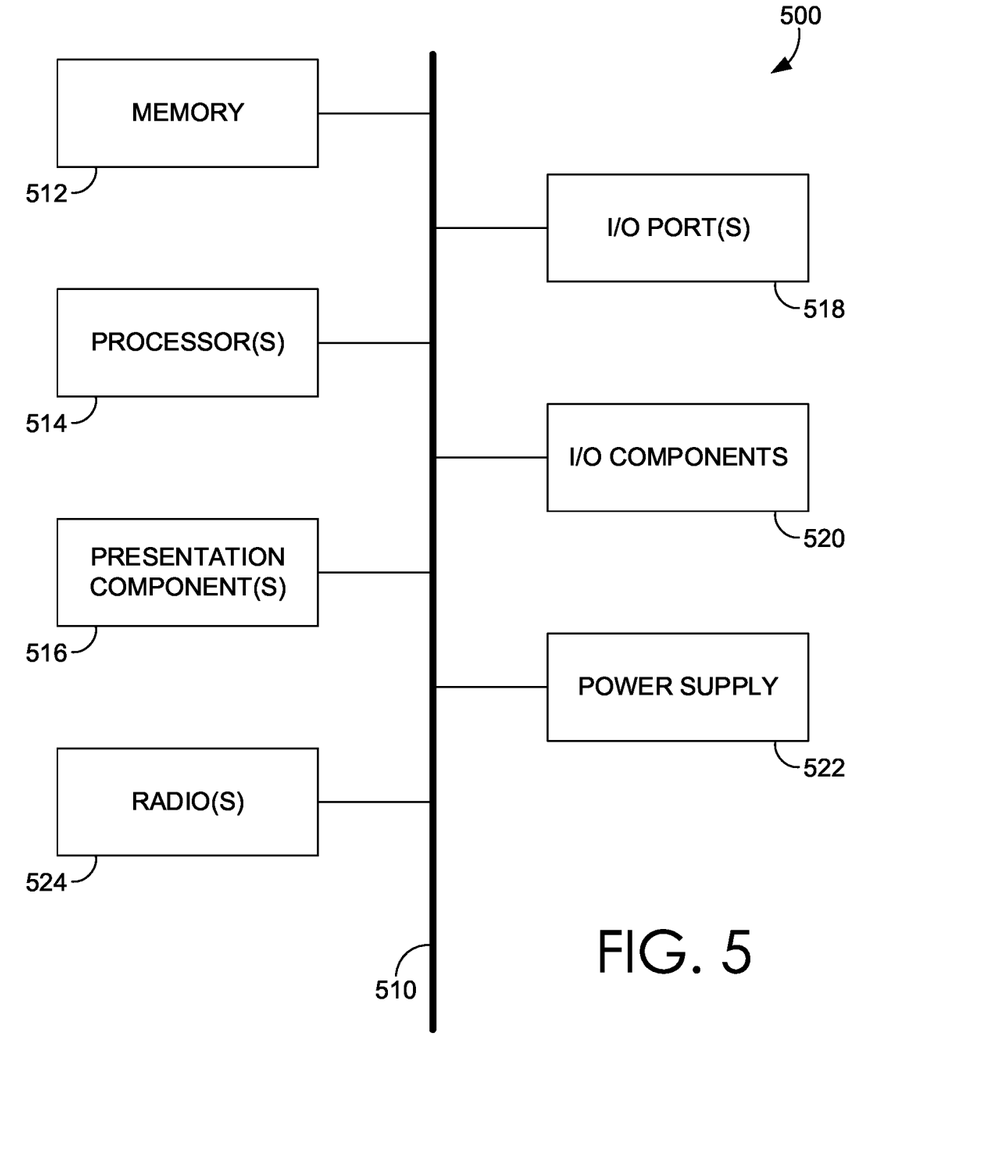
FIG. 5 depicts an exemplary computing device suitable for use in implementations of the present disclosure, in accordance with aspects herein.

In some aspects, each of the UEs 102, 104, 106, 108, and 110 may correspond to computing device 500 in FIG. 5.

Thus, a UE can include, for example, a display(s), a power source(s) (e.g., a battery), a data store(s), a speaker(s), memory, a buffer(s), a radio(s) and the like. In some implementations, for example, devices such the UEs 102, 104, 106, 108, and 110 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, UEs 102, 104, 106, 108, and 110 in network environment 100 can optionally utilize one or more communication channels 112 to communicate with other computing devices (e.g., a mobile device(s), a server(s), a personal computer(s), etc.) through base station 114. Base station 114 may be a gNodeB in a 5G or 6G network.

The network environment 100 may be comprised of a telecommunications network(s), or a portion thereof. A telecommunications network might include an array of devices or components (e.g., one or more base stations), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network environment 100 can include multiple networks, as well as being a network of networks, but is shown in more simple form so as to not obscure other aspects of the present disclosure.

The one or more communication channels 112 can be part of a telecommunication network that connects subscribers to their immediate telecommunications service provider (i.e., home network carrier). In some instances, the one or more communication channels 112 can be associated with a telecommunications provider that provides services (e.g., 3G network, 4G network, LTE network, 5G network, 6G network, and the like) to user devices, such as UEs 102, 104, 106, 108, and 110. For example, the one or more communication channels may provide voice, SMS, and/or data services to UEs 102, 104, 106, 108, and 110, or corresponding users that are registered or subscribed to utilize the services provided by the telecommunications service provider. The one or more communication channels 112 can comprise, for example, a 1× circuit voice, a 3G network (e.g., CDMA, CDMA2000, WCDMA, GSM, UMTS), a 4G network (WiMAX, LTE, HSDPA), a 5G network or a 6G network.

In some implementations, base station 114 is configured to communicate with a UE, such as UEs 102, 104, 106, 108, and 110, that are located within the geographic area, or cell, covered by radio antennas of base station 114. Base station 114 may include one or more base stations, base transmitter stations, radios, antennas, antenna arrays, power amplifiers, transmitters/receivers, digital signal processors, control electronics, GPS equipment, and the like. In particular, base station 114 may selectively communicate with the user devices using dynamic beamforming.

As shown, base station 114 is in communication with a network component 130 and at least a network database 120 via a backhaul channel 116. As the UEs 102, 104, 106, 108, and 110 collect individual status data, the status data can be automatically communicated by each of the UEs 102, 104, 106, 108, and 110 to the base station 114. Base station 114 may store the data communicated by the UEs 102, 104, 106, 108, and 110 at a network database 120. Alternatively, the base station 114 may automatically retrieve the status data from the UEs 102, 104, 106, 108, and 110, and similarly store the data in the network database 120. The data may be communicated or retrieved and stored periodically within a predetermined time interval which may be in seconds, minutes, hours, days, months, years, and the like. With the incoming of new data, the network database 120 may be refreshed with the new data every time, or within a predetermined time threshold so as to keep the status data stored in the network database 120 current. For example, the data may be received at or retrieved by the base station 114 every 10 minutes and the data stored at the network database 120 may be kept current for 30 days, which means that status data that is older than 30 days would be replaced by newer status data at 10 minute intervals. As described above, the status data collected by the UEs 102, 104, 106, 108, and 110 can include, for example, service state status, the respective UE's current geographic location, a current time, a strength of the wireless signal, available networks, and the like.

The network component 130 comprises a memory 132 and an OBD II module 134. The OBD II module 134 includes a low power radar-based sensor as described below. All determinations, calculations, and data further generated by the OBD II module 134, and may be stored at the memory 132 and also at the data store 140. Although the network component 130 is shown as a single component comprising the memory 132 and OBD II module 134, it is also contemplated that each of the memory 132 and OBD II may reside at different locations, be its own separate entity, and the like, within the home network carrier system. The OBD II module 134 is plugged into an OBD II port in the vehicle and is in communication with the network 100.

The network component 130 is configured to retrieve signal information, UE device information, slot configuration, latency information, including quality of service (QOS) information, and metrics from the base station 114 or one of the UE devices 102, 104, 106, 108, and 110. The information may also include radio frequency (RF) signal quality information, such as signal to interference and noise (SINR) ratio. UE device information can include a device identifier and data usage information. The OBD II module 134 may gather vehicle information such as mileage, distance, routing, driving patterns, driver or driver driving patterns, vibration information, acceleration and deceleration data, braking, accident, impact, disturbance, and similar data.

Figure 2:
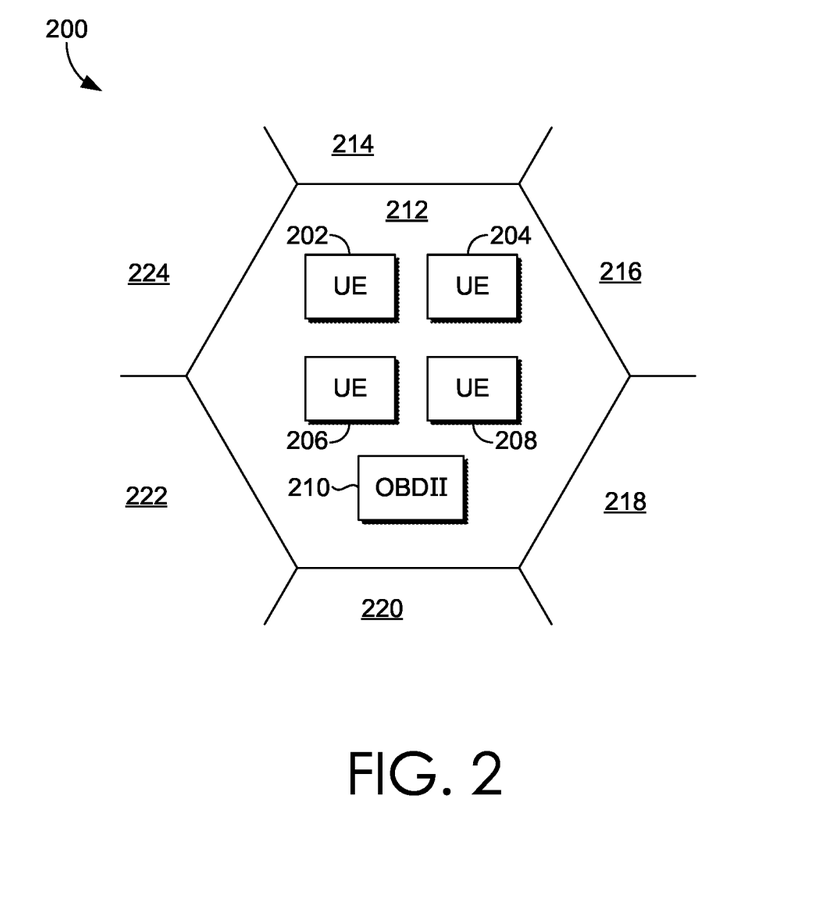
FIG. 2 depicts a cellular network suitable for use in implementations of the present disclosure, in accordance with aspects herein.

FIG. 2 depicts a cellular network suitable for use in implementations of the present disclosure, in accordance with aspects herein. For example, as shown in FIG. 2, each geographic area in the plurality of geographic areas may have a hexagonal shape such as hexagon representing a geographic area 200 having cells 212, 214, 216, 218, 220, 222, 224, each including base station or base station 114, backhaul channel 116, antenna for sending and receiving signals over communication channels 112, network database 120 and network component 130. The size of the geographic area 200 may be predetermined based on a level of granularity, detail, and/or accuracy desired for the determinations/calculations done by the systems, computerized methods, and computer-storage media. A plurality of UEs may be located within each geographic area collecting UE data within the geographic area at a given time. For example, as shown in FIG. 2, UEs 202, 204, 206, 208, and OBD II module 210, may be located within geographic area 200 collecting UE data that is useable by network component 130, in accordance with aspects herein. UEs 202, 204, 206, 208, and OBD II module 210 can move within the cell currently occupying, such as cell 212 and can move to other cells such as adjoining cells 214, 216, 218, 220, 222 and 224.

Figure 3:
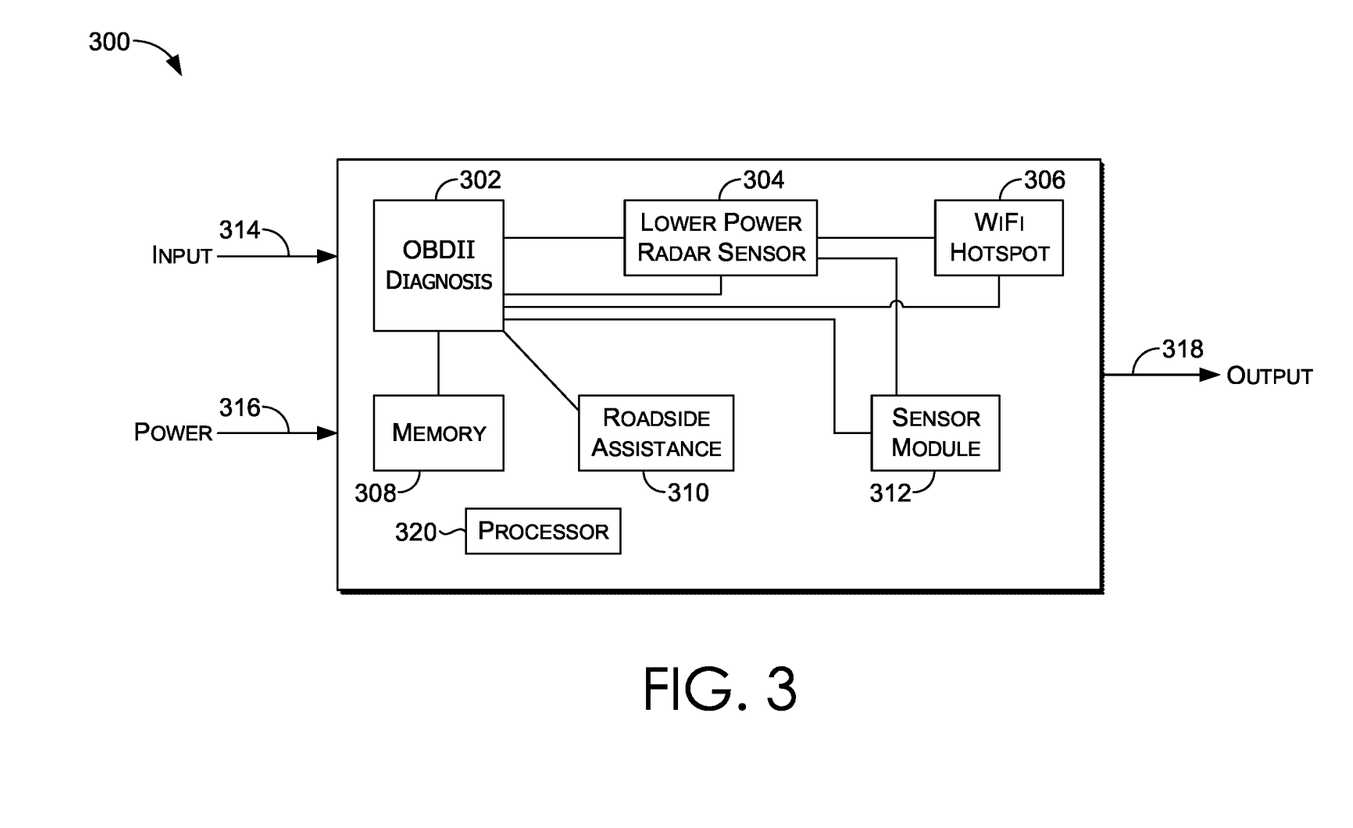
FIG. 3 depicts a block diagram of a OBD II module incorporating a low power radar-based sensor, in which implementations of the present disclosure may be employed, in accordance with aspects herein.

FIG. 3 depicts a block diagram of a OBD II module incorporating a low power radar-based sensor, in which implementations of the present disclosure may be employed, in accordance with aspects herein. OBD II module 300 incorporates sub-modules including OBD II diagnostics sub-module 302. The OBD II diagnostics sub-module 302 provides vehicle system data, such as engine performance monitoring, oil consumption, environmental data, such as pollution, and others. The low power radar sensor 304 may be in communication with the OBD II diagnostics sub-module. A WiFi hotspot 306 may also be included and may be in communication with the OBD II diagnostics sub-module 302 and the low power radar sensor 304. A memory 308 may be used to store vehicle diagnostic information from the OBD II diagnostics sub-module 302, low power radar sensor 304, WiFi hotspot 306, roadside assistance module 310, and sensor module 312.

The low power radar sensor 304 may be a pulsed coherent radar capable of providing millimeter scale resolution at high updating frequencies. The data can be used for object detection, range measurement, and position tracking. Object detection allows for a person or persons entering the car can be detected and, in conjunction with artificial intelligence (AI) and machine learning (ML) techniques, determine if a regular driver has entered the vehicle or an unknown person. An unknown person may increase the likelihood that the low power radar sensor 304 has detected vehicle theft as it is occurring.

Pulsed coherent radar systems turn off the transmitter between pulses. In contrast, coherent radar systems transmit a continuous stream of pulses and use precise phase measurements of the return signals to provide high accuracy. The pulses in a pulsed coherent radar system are sweeps, or bursts of pulses with a known starting phase. Pulse duration can be adjusted, depending on the application. For example, different pulse durations can be used when the vehicle is parked and an intrusion detection mode is activated. A different pulse duration can be selected after it is determined that the vehicle's owner or other permitted driver is behind the wheel. Small movements, such as hand gestures or facial expressions may use shorter pulse durations. Because the pulsed coherent radar system is not continuously transmitting pulses and because pulse durations can be adjusted, significant power savings are possible.

A frequency modulated continuous wave radar may also be used in low power radar sensor 304. In frequency modulated continuous wave radar the carrier frequency is modulated over a bandwidth. A phase locked loop (PLL) generates pulses or "chirps," signals which increase in frequency linearly over time. Once the reflected wave returns, the time delay and the distance to the target can be determined from the difference in frequency. The difference in distance to the target can indicate that a taller or shorter individual than an owner or permitted driver is in the vehicle.

The WiFi hotspot 306 provides connectivity with a cellular network or wide area network (WAN). The WiFi hotspot 306 receives data from the OBD II diagnostics sub-module 302, low power radar sensor 304, sensor module 312, roadside assistance module 310, and memory 308. The data may be transmitted over the network and may also be stored at network component 130 in FIG. 1, as well as at network database 120.

Roadside assistance module 310 provides emergency contact assistance in the event of a crash or medical emergency. The sensor module 312 may communicate with roadside assistance module 310 to share data and information needed to provide emergency contact services. The sensor module 312 may incorporate gyroscopes and/or accelerometers to aid in crash detection and may also be in communication with low power radar sensor 304. The low power radar sensor 304 works in conjunction with sensor module 312 to determine intrusion as well determine if the driver and all passengers have exited the vehicle. This can be lifesaving if a child or pet has been forgotten in the backseat. The low power radar sensor 304 senses when drivers and passengers enter the vehicle and when they leave, allowing determination that all have left the vehicle.

The OBD II module 300 provides multiple services to drivers. The OBD II module 300 can track driving behavior and monitor vehicle health and performance. In addition, vehicle location may be tracked in near real-time with break-in or disturbance alerts, tow alerts, and similar notifications. At least one processor 320 may be included to perform calculations, determinations, comparisons, and similar functions. The included WiFi hotspot 306 provides connectivity and entertainment with the ability to connect multiple devices. Roadside assistance module 310 provides emergency assistance. The low power radar sensor 304 and sensor module 312 provide parked disturbance, tamper, or intrusion alerts. Power is supplied from the vehicle's battery through power input 316. Input data may be provided through input 314. The OBD II module 300 may communicate with a network through output 318.

The sensor module 312 may incorporate gyroscopes and/or accelerometers to notify the owner. The low power radar sensor 304 may determine how many people enter the vehicle when a vibration detection is measured. The low power radar sensor 304 may store radar signatures from individuals and compare new radar signatures with previously stored radar signatures. If the comparison indicates the individual is not the owner an alert may be triggered. Owners could indicate in advance if a new driver was permitted, preventing a false alarm when a new driver, such as renter, enters the vehicle. An advantage of the low power radar sensor 304 is that the multi-minute lag time before issuing an alert can be eliminated.

Figure 4:
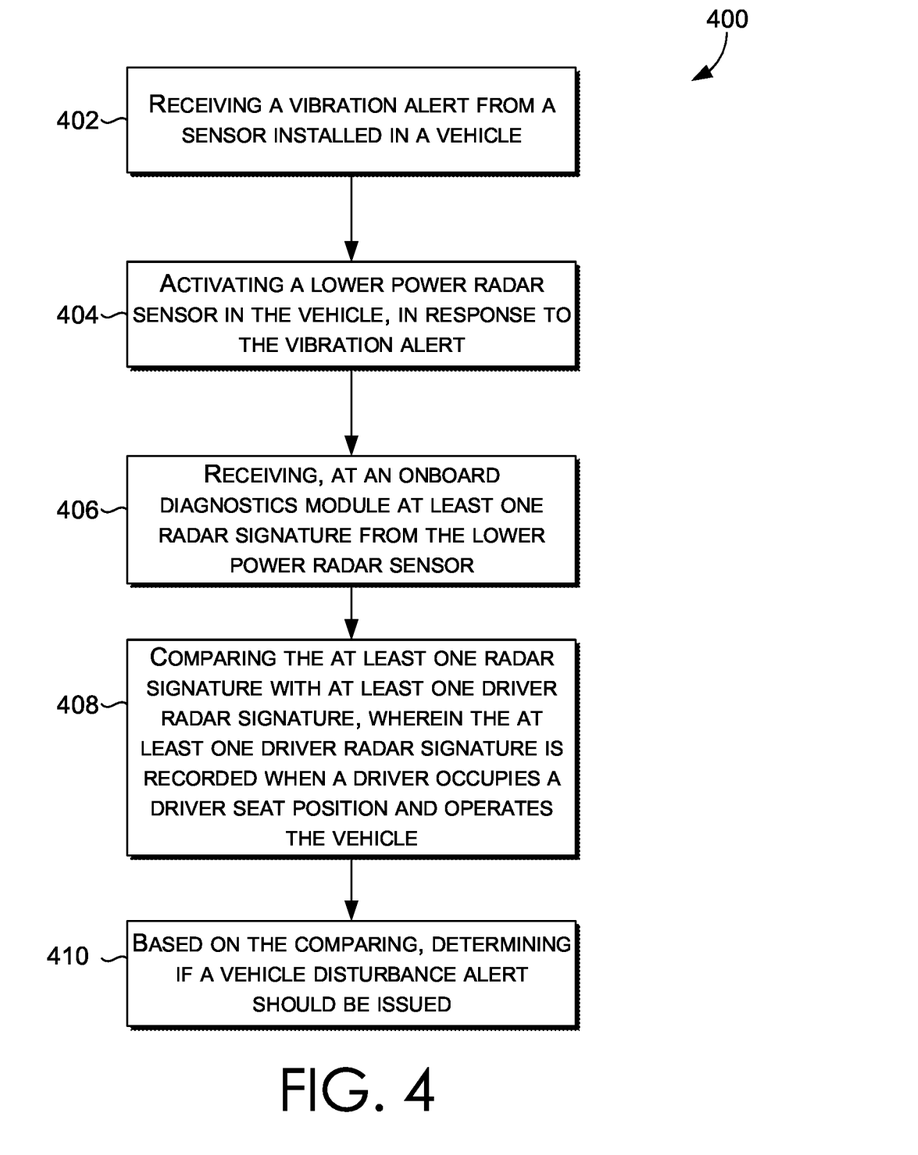
FIG. 4 is a flow diagram of an exemplary method of vehicle disturbance alerting in an exemplary network environment, in which aspects of the present disclosure may be employed, in accordance with aspects herein.

FIG. 4 is a flow diagram of an exemplary method of vehicle disturbance alerting in an exemplary network environment, in which aspects of the present disclosure may be employed, in accordance with aspects herein. The method 400 begins with receiving a vibration alert from a sensor in step 402. The vibration alert may be provided by an accelerometer or a gyroscope in the sensor module installed in the vehicle. Then, in step 402, the method continues with activating a low power radar sensor in the vehicle in response to the vibration alert. In step 404 the method continues with receiving, at an onboard diagnostics module, at least one radar signature from the low power radar sensor. The at least one radar signature is compared with at least one driver radar signature in step 406. The driver radar signature is recorded when a driver occupies a driver seat position and operates the vehicle. A driver radar signature may be recorded by a driver after purchasing a new vehicle, installing the apparatus described herein, renting a vehicle, or borrowing a vehicle with the owner's permission. Based on the comparing, determining if a vehicle disturbance alert should be issued occurs in step 408.

Regular drivers and passengers of the vehicle may have recorded radar signatures stored in the memory as driver radar signatures and as passenger radar signatures. The OBD II module 300 can determine if a vibration or disturbance alert occurs in a front set or rear seat of a vehicle. Alerts may be issued if a person entering the vehicle generates a radar signature that does not match any of the stored driver or passenger radar signals. The OBD II module 300 may also determine that a second vibration alert may occur after a period of vehicle operation. This reflects the vehicle stopping, the transmission placed in park, and occupants exiting the vehicle. If the number of occupants exiting the vehicle does not match the number who entered, an alert may be issued. This provision may save children or pet lives when a driver forgets rear seat occupants.

FIG. 5 depicts an exemplary computing device suitable for use in implementations of the present disclosure, in accordance with aspects herein. With continued reference to FIG. 5, computing device 500 includes bus 502 that directly or indirectly couples the following devices: memory 504, one or more processors 506, one or more presentation components 508, input/output (I/O) ports 512, I/O components 510, radio 516, transmitter 518, and power supply 514. Bus 502 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O components 510. Also, processors, such as one or more processors 506, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "computer" or "computing device."

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. Memory 504 may be removable, nonremovable, or a combination thereof. Exemplary memory includes solid-state memory, hard drives, optical-disc drives, etc. Computing device 500 includes one or more processors 506 that read data from various entities such as bus 502, memory 504 or I/O components 510. One or more presentation components 508 present data indications to a person or other device. Exemplary one or more presentation components 508 include a display device, speaker, printing component, vibrating component, etc. I/O ports 512 allow computing device 500 to be logically coupled to other devices including I/O components 510, some of which may be built into computing device 500. Illustrative I/O components 510 include a microphone, joystick, game pad, satellite dish, scanner, printer, wireless device, etc.

The radio 516 represents one or more radios that facilitate communication with a wireless telecommunications network. While a single radio 516 is shown in FIG. 5, it is contemplated that there may be more than one radio 516 coupled to the bus 502. In aspects, the radio 516 utilizes a transmitter 518 to communicate with the wireless telecommunications network. It is expressly conceived that a computing device with more than one radio 516 could facilitate communication with the wireless telecommunications network via both the first transmitter 518 and an additional transmitters (e.g. a second transmitter). Illustrative wireless telecommunications technologies include CDMA, GPRS, TDMA, GSM, and the like. The radio 516 may additionally or alternatively facilitate other types of wireless communications including Wi-Fi, WiMAX, LTE, 3G, 4G, LTE, 5G, 6G, NR, VOLTE, or other VoIP communications. As can be appreciated, in various embodiments, radio 516 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even base stations (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method of vehicle disturbance alerting in a network, the method comprising:
   receiving a vibration alert from a sensor installed in a vehicle;
   activating a low power radar sensor in the vehicle in response to the vibration alert;
   receiving, at an onboard diagnostics module, at least one radar signature from the low power radar sensor;
   comparing the at least one radar signature with at least one driver radar signature, wherein the at least one driver radar signature is recorded when a driver occupies a driver seat position and operates the vehicle; and
   based on the comparing, determining if a vehicle disturbance alert should be issued.

2. The method of claim 1, further comprising issuing a vehicle disturbance alert in response to the determining.

3. The method of claim 1, further comprising storing the at least one radar signature as a driver radar signature.

4. The method of claim 3, wherein the comparing at least one radar signature compares the at least one radar signature with at least one driver radar signature.

5. The method of claim 1, wherein radar signatures are received from multiple locations in the vehicle.

6. The method of claim 5, wherein the radar signatures received indicate at least one of child or pet.

7. The method of claim 1, further comprising receiving a second vibration alert from the sensor after a vehicle operation period.

8. The method of claim 7, wherein the second vibration alert from sensor occurs after the vehicle transmission is placed in park.

9. An apparatus for vehicle disturbance alerting in a network, the apparatus comprising:
   a sensor module in communication with an onboard diagnostics module in a vehicle; and
   a low power radar sensor in communication with at least one processor, a memory, the sensor module, and the onboard diagnostics module, wherein the low power radar sensor is configured to record at least one driver radar signature in response to a vibration alert generated by the sensor module when a driver occupies a driver seat position and operates the vehicle, wherein the at least on processor compares the at least one driver radar signature with at least one previously stored driver radar signature, wherein the at least one processor determines if a vehicle disturbance alert should be issued based on the comparing.

10. The apparatus of claim 9, wherein the memory stores at least one driver radar signature.

11. The apparatus of claim 9, wherein the sensor module incorporates at least one of a gyroscope or accelerometer.

12. The apparatus of claim 9, wherein the sensor module activates the low power radar sensor in response to a vibration alert.

13. The apparatus of claim 12, wherein vibration alerts are received from multiple locations on or in the vehicle.

14. A non-transitory computer storage media storing computer-useable instructions that, when used by one or more processors, cause the processors to:
   receive a vibration alert from a sensor installed in a vehicle;
   activate a low power radar sensor in the vehicle in response to the vibration alert;
   receive, at an onboard diagnostics module, at least one radar signature from the low power radar sensor;
   compare the at least one radar signature with at least one driver radar signature, wherein the at least one driver radar signature is recorded when a driver occupies a driver seat and operates the vehicle; and
   based on the comparing, determine if a vehicle disturbance alert should be issued.

15. The non-transitory computer storage media of claim 14, further comprising issuing a vehicle disturbance alert in response to the determination.

16. The non-transitory computer storage media of claim 14, further comprising store the at least one radar signature as a driver radar signature.

17. The non-transitory computer storage media of claim 16, wherein the comparing at least one radar signature compares the at least one radar signature with at least one driver radar signature.

18. The non-transitory computer storage media of claim 14, wherein radar signatures are received from multiple locations in the vehicle.

19. The non-transitory computer storage media of claim 14, further comprising receive a second vibration alert from the sensor after a vehicle operation period.

* * * * *